(12) United States Patent
Lherbier et al.

(10) Patent No.: US 7,651,657 B2
(45) Date of Patent: Jan. 26, 2010

(54) MANUFACTURING OF CONTROLLED POROSITY METALLIC TOOLS

(75) Inventors: Louis W. Lherbier, Pittsburgh, PA (US); David J. Novotnak, McDonald, PA (US)

(73) Assignee: CRS Holdings, Inc., Wilmington, DE (US)

( * ) Notice: Subject to any disclaimer, the term of this patent is extended or adjusted under 35 U.S.C. 154(b) by 0 days.

(21) Appl. No.: 12/052,242

(22) Filed: Mar. 20, 2008

(65) Prior Publication Data

US 2008/0226486 A1 Sep. 18, 2008

Related U.S. Application Data

(63) Continuation-in-part of application No. 10/561,347, filed as application No. PCT/US2004/019587 on Jun. 18, 2004, now abandoned.

(60) Provisional application No. 60/480,453, filed on Jun. 20, 2003.

(51) Int. Cl.
*B22F 3/11* (2006.01)
(52) U.S. Cl. .............................. 419/2; 418/8
(58) Field of Classification Search ............ 419/2, 419/8
See application file for complete search history.

(56) References Cited

U.S. PATENT DOCUMENTS

| | | | | |
|---|---|---|---|---|
| 3,700,626 A | * | 10/1972 | Chandhok | 524/121 |
| 4,063,940 A | * | 12/1977 | Dain et al. | 419/30 |
| 4,389,362 A | * | 6/1983 | Larsson | 419/8 |
| 4,428,906 A | * | 1/1984 | Rozmus | 419/48 |
| 4,478,626 A | * | 10/1984 | Moritoki et al. | 65/17.3 |
| 4,723,999 A | * | 2/1988 | Hasselstrom | 75/236 |
| 5,374,392 A | * | 12/1994 | Skelcey et al. | 419/49 |
| 5,625,861 A | * | 4/1997 | Nishi et al. | 419/2 |
| 5,850,590 A | * | 12/1998 | Furuta et al. | 419/49 |

* cited by examiner

*Primary Examiner*—Roy King
*Assistant Examiner*—Ngoclan T Mai
(74) *Attorney, Agent, or Firm*—Dann, Dorfman, Herrell and Skillman, P.C.

(57) ABSTRACT

A process for making a metal tool having controlled porosity is disclosed. The process includes the step of preparing metal powder by gas atomization. The metal powder is filled into a metal container. The powder-filled container is placed in a metal vessel and surrounded with glass frit. The metal vessel is then heated to a temperature sufficient to melt the glass frit. The metal vessel is then compacted under sufficient pressure to partially consolidate the metal powder so as to retain porosity therein in an amount sufficient to permit air to vent through the metal tool.

12 Claims, 1 Drawing Sheet

MANUFACTURING OF CONTROLLED POROSITY METALLIC TOOLS

CROSS REFERENCE

This application is a continuation-in-part of nonprovisional application Ser. No. 10/561,347, filed Dec. 19, 2005, now abandoned, which is the U.S. National Stage of International Application No. PCT/US2004/019587, filed Jun. 18, 2004, which claims the benefit of priority of provisional Application No. 60/480,453, filed Jun. 20, 2003.

FIELD OF THE INVENTION

This invention relates to tools for metal injection molding, and in particular, to a process for making such tools by powder metallurgy techniques such that they have a controlled amount of porosity.

BACKGROUND OF THE INVENTION

Plastic injection molding is a very large industry, and we rely on hundreds of plastic injection molded products every day. The list is endless, but includes interior automotive parts, cell phone cases and windows, caps and closures, children's toys, kitchen items, office equipment, etc. Even though great advances have been made in this industry, product complexity and production rates are still limited. These limitations do not result from the injection molding machines themselves, but rather from the restrictions imposed by tooling design and tooling materials used in the injection molding machines.

The known tools for injection molding machines are made from cast and wrought steel and have been available for over 50 years. The known injection molding tools exhibit a number of disadvantages. The known machines are designed so that air can vent from the mold cavity as it is filled with the plastic material. The tools are usually inefficiently cooled by water passing through channels drilled into the mold walls. Production efficiency is low because the plastic component must remain in the mold until it is solid enough to hold its shape and be ejected. Other features such as surface quality can also be impaired by cooling inefficiencies. Better and more consistent cooling of the mold would mean that the plastic solidifying temperature could be reached sooner, thus reducing cycle time, and increasing productivity.

Based on current knowledge of gas and gas usage, polymer processing techniques, and the metallurgy of tool materials, a new cooling technology has been developed which has been described as a major breakthrough for the plastic forming industry and especially for plastic injection molding. This technology holds promise for increased productivity, greater design freedom for complex products, increased profits and a widened product scope because it has the potential to reduce production cycle times by 20 to 40%.

The new technology is an advanced cooling concept in which liquid cooling gas is injected into the mold where it evaporates. The resulting gas vents from the mold. This technology requires a mold material manufactured with uniform and controlled porosity to effect optimum cooling. By using micro pores in the mold material, the evaporative cooling points can be situated close to the forming surface of the mold. There is no restriction on the geometry of the mold in the same way as molds made with drilled water channels.

While the technology of gas cooling is viable, the difficulty has been the availability of a suitable material for the molds and the inability to obtain a controlled and consistent quality level of microporosity in the mold material. Further, no efficient technique was available to manufacture a composite mold with a porous interior and a solid surface layer, as is required in many applications where surface quality is of paramount importance.

Attempts to manufacture such tooling by conventional powder metallurgy press-and-sinter techniques have failed to produce the desired results. Those techniques cannot produce the required porosity levels with the degree of control required. Moreover, the press-and-sinter technique produces a non-uniform pore size in the tool material. With this type of variation, the cooling of the tool surface cannot be controlled, and the positives of the new gas cooling technique cannot be effectively utilized. Further, conventional powder metallurgy press and sinter technology cannot produce a solid surface on the tool, while at the same time producing a controlled and consistent microporous substructure.

It is clear that a material and process needs to be developed to manufacture tooling that can take advantage of the new gas cooling concept for plastic injection molding tools and molds. The process according to the present invention involves the utilization of corrosion resistant materials in combination with a powder metallurgy consolidation process that can produce a microporous tool with controlled porosity and pore size. Further, the consolidation technology according to this invention can produce composite tools designed to have both solid surfaces and porous areas as required for a particular application. Unlike other powder metallurgy consolidation processes, the process according to the present invention provides higher pressure, lower consolidation temperatures, and lower cycle times by orders of magnitude. These advantages result in lower manufacturing costs and significantly lower capital investment.

SUMMARY OF THE INVENTION

The drawbacks associated with the known ways of making injection molding tools are solved to a large degree by a process in accordance with the present invention. The process for making a metal tool having controlled porosity according to this invention begins with the step of preparing a metal powder by gas atomization. The metal powder is filled into a metal container. The powder-filled container is placed inside a metal vessel and surrounded with glass frit material. The metal vessel is then heated to a temperature sufficient to melt the glass frit, but not adversely affect the desired properties of the metal powder. The metal vessel is then compacted under sufficient pressure to partially consolidate the metal powder so as to retain porosity therein in an amount sufficient to permit air to vent through the metal tool.

This new process of manufacturing controlled and uniformly consistent microporous corrosion resistant tool products not only increases plastic injection molding productivity by 20 to 40%, but also eliminates many inherent cooling and quality difficulties currently encountered with conventional mold fabrication technology. Moreover, the tools made in accordance with the present invention can be made more rapidly than with known hot isostatic consolidation techniques. Because the injection molds are porous, air can vent through the walls of the mold as the plastic material is being injected. This eliminates the venting problem of conventional molds. In addition, after injection of the plastic into the mold cavity, a small amount of liquid gas can be injected into the mold to release the part quickly and easily. The result will be fewer jammed injection machines, and fewer rejects for ejector marks. Overall, this technology provides tooling for plastic injection molding that has part cooling, air venting, and surface quality advantages over tooling currently used in the industry.

BRIEF DESCRIPTION OF THE DRAWINGS

The foregoing summary and the following detailed description will be better understood when read with reference to the drawings wherein.

DETAILED DESCRIPTION

The present invention includes a process for manufacturing a corrosion resistant, microporous material product with open and/or closed surfaces that can be used to effect uniform and consistent cooling of tools used for plastic injection molding. The process initially involves producing gas atomized powder metals by known powder metallurgy techniques. In a second step, a shaped container is prepared for holding the powdered metal. The powder-filled container is heated to an appropriate temperature and then consolidated. The assembly is consolidated quasi-isostatically in a liquid medium at controlled pressure by means of a standard hydraulic press. The consolidation process is essentially a one-step operation.

Figure 1:
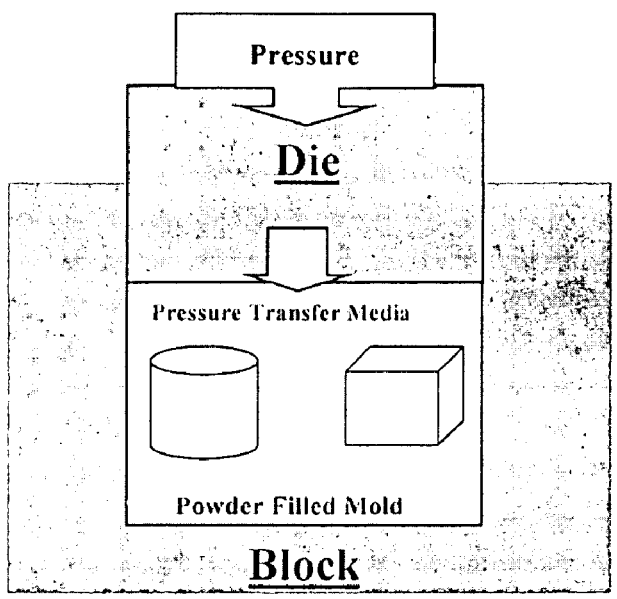
FIG. 1 is a schematic diagram of the compacting step in the process according to the present invention.

A preferred embodiment of the process according to the present invention will now be described with reference to FIG. 1 of the drawings. The material for the microporous tool is selected in accordance with the operating environment of the plastic injection molding process and the components to be manufactured. The gas atomized metal powder is screened to a particle size distribution consistent with the porosity level, pore size, and strength required by the mold application. A wide range of powder particle sizes can be used for cost effectiveness. Good results have been obtained with powder particle sizes of −80 mesh and smaller. However, it will be appreciated that different sizes may be more appropriate for other types of injection molding tools. The screened powder is vibration filled into a shaped container. The shape of the container is dictated by the physical design of the injection mold. The powder-filled container is evacuated, sealed by crimping the evacuation nozzle, and then welded shut.

Figure 2A:
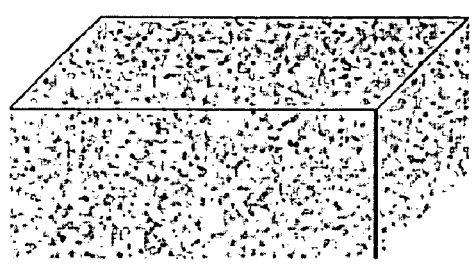
FIG. 2A is a perspective view of a segment of a tool blank made by the process according to one aspect of the present invention.

Consolidation of the metal powder proceeds as follows. The powder/container assembly is placed in an open metal vessel in which it is surrounded by glass frit. The metal vessel containing the powder/container assembly and the glass frit is placed into a furnace. The metal vessel is heated to a temperature appropriate for the tool material and high enough to melt and liquify the glass frit. After an appropriate time to reach temperature uniformity, the vessel/container assembly is removed from the furnace. It is placed in a pot die that is placed or located in a hydraulic press. Sufficient pressure is applied with the press to the assembly in the pot die to consolidate the metal powder while retaining the desired amount of porosity. The pressure transfer medium in the pot die is a molten but highly viscous glass frit. After pressing, the consolidated powder and container assembly is ejected from the press and allowed to cool to room temperature. FIG. 2A shows a fully porous tool blank made by the process according to the present invention.

Consolidation trials on metal powder alloys 420 LC, a stainless steel, and H13, a tool steel, have demonstrated that porosity can be controlled from a low of 60% dense to 100% dense. Pore size can also be controlled by process variables. Key variables of the process include powder particle size, consolidation temperature, and the pressure exerted by the hydraulic press. A preferred temperatures range is about 1850° F. to about 2050° F. A preferred forging pressure range is about 6 tons per square inch (tsi) to about 14.5 tsi (about 12-29 ksi). The liquid glass media exerts a quasi-isostatic pressure on the containerized metal powder and produces a substantially uniform porosity throughout the entire product. Additionally, the relatively low pressing temperatures help prevent the formation of deleterious phases in the matrix material that may form in complex alloys at the higher temperatures used in the conventional powder metallurgy consolidation processes. The process proceeds rapidly such that the porous tools can be formed in the press in a matter of seconds.

Figure 2B:
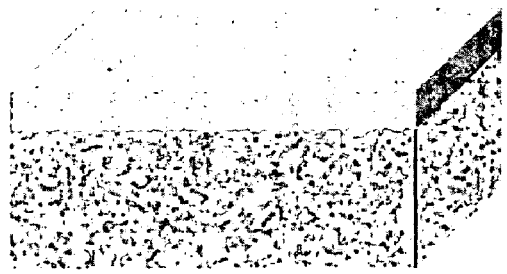
FIG. 2B is a perspective view of a segment of a composite tool blank made by the process according to a second aspect of the present invention.

Surface finish is critical for some injection molded plastic parts and a fully porous tool would not provide the desired surface finish. To resolve that problem, composite tools with areas of solid and porous structure, as well as composite tools with varying material compositions, can also be produced by a process according to another aspect of the present invention. The alternate procedure includes the placement of a piece of a solid, cast and wrought, material in the metal container prior to filling in the metal powder. The metal container is then filled with the metallic powder and consolidated as described above. The metal powder bonds to the solid material during the consolidation step. The resulting tool product has a composite structure consisting of a fully dense surface layer and an internal porous substructure. FIG. 2B shows a composite tool blank made by the process according to this invention. This composite structure provides a tool that has a good surface for interfacing with the plastic part while still providing the desired cooling effect afforded by the porous substructure.

In view of the foregoing description, some of the novel features and advantages of the process according to the present invention should now be apparent. The process according to this invention can produce controlled porosity levels in plastic injection molding tools more uniformly and at lower costs than the known powder metallurgy consolidation techniques. Both large and small tools with uniform porosity can be produced by the process. The use of this process to manufacture tools for plastic injection molding will have a significant positive economic impact on this very important industry.

What is claimed is:

1. A process for making a metal tool having controlled porosity, comprising the steps of:
    preparing metal powder by gas atomization;
    filling a metal container with the metal powder;
    placing the powder-filled container in a metal vessel;
    surrounding the powder-filled container in the metal vessel with glass frit;
    heating the metal vessel to a temperature sufficient to melt the glass frit;
    placing the heated metal vessel in a die to form a die/metal vessel assembly;
    placing the die/metal vessel assembly in a press; and then
    compacting the metal vessel in the press under sufficient pressure to partially consolidate the metal powder so as to retain porosity therein in an amount sufficient to permit air to vent through the metal tool.

2. A process as set forth in claim 1 wherein the step of preparing the metal powder comprises preparing a tool steel powder.

3. A process as set forth in claim 1 wherein the step of heating the metal vessel comprises the step of heating the metal vessel at a temperature of about 1850° F. to about 2050° F.

4. A process as set forth in claim 1 wherein the step of compacting the metal vessel comprises the step of pressing the metal vessel at a pressure of about 6 tsi to about 14.5 tsi.

5. A process as set forth in claim 1 wherein prior to the step of filling the metal container, the process comprises the step of screening the metal powder to provide a powder particle size that is appropriate for the type of product for which the metal tool will be used.

6. A process for making a composite metal tool having controlled porosity, comprising the steps of:
    preparing metal powder by gas atomization;
    placing a piece of a fully consolidated metal in a metal container;
    filling the metal container with the metal powder;
    placing the powder-filled container in a metal vessel;
    surrounding the powder-filled container in the metal vessel with glass frit;
    heating the metal vessel to a temperature sufficient to melt the glass frit;
    placing the heated metal vessel in a die to form a die/metal vessel assembly;
    placing the die/metal vessel assembly in a press; and then
    compacting the metal vessel under sufficient pressure to bond the metal powder to the fully consolidated metal piece and to partially consolidate the metal powder so as to retain porosity therein in an amount sufficient to permit air to vent through the metal tool.

7. A process as set forth in claim 6 wherein the step of preparing the metal powder comprises preparing a tool steel powder.

8. A process as set forth in claim 6 wherein the step of heating the metal vessel comprises the step of heating the metal vessel at a temperature of about 1850° F. to about 2050° F.

9. A process as set forth in claim 6 wherein the step of compacting the metal vessel comprises the step of pressing the metal vessel at a pressure of about 6 tsi to about 14.5 tsi.

10. A process as set forth in claim 6 wherein prior to the step of filling the metal container, the process comprises the step of screening the metal powder to provide a powder particle size that is appropriate for the type of product for which the metal tool will be used.

11. A process as set forth in claim 1 wherein the step of placing the die/metal vessel assembly into a press comprises placing the die/metal vessel assembly into a hydraulic press.

12. A process as set forth in claim 6 wherein the step of placing the die/metal vessel assembly into a press comprises placing the die/metal vessel assembly into a hydraulic press.

* * * * *